United States Patent
Mortensen et al.

(10) Patent No.: US 10,612,894 B2
(45) Date of Patent: Apr. 7, 2020

(54) METHOD AND SYSTEM FOR RELIABLY CHANGING OPERATION MODE OF A WEAPON

(71) Applicant: Kongsberg Defence & Aerospace AS, Kongsberg (NO)

(72) Inventors: Ivar Mortensen, Oslo (NO); Erik Narverud, Kongsberg (NO)

(73) Assignee: KONGSBERG DEFENCE & AEROSPACE AS, Kongsberg (NO)

( * ) Notice: Subject to any disclaimer, the term of this patent is extended or adjusted under 35 U.S.C. 154(b) by 86 days.

(21) Appl. No.: 16/108,271

(22) Filed: Aug. 22, 2018

(65) Prior Publication Data

US 2019/0093993 A1    Mar. 28, 2019

(30) Foreign Application Priority Data

Aug. 23, 2017 (NO) .................................. 20171387

(51) Int. Cl.
| | |
|---|---|
| *F41H 13/00* | (2006.01) |
| *F42B 35/00* | (2006.01) |
| *F42C 17/04* | (2006.01) |
| *G06F 13/10* | (2006.01) |
| *G06F 13/16* | (2006.01) |
| *H04L 29/06* | (2006.01) |
| *F42C 21/00* | (2006.01) |

(52) U.S. Cl.
CPC ............ *F41H 13/00* (2013.01); *F42B 35/00* (2013.01); *F42C 17/04* (2013.01); *G06F 13/102* (2013.01); *G06F 13/16* (2013.01); *H04L 69/08* (2013.01); *F42C 21/00* (2013.01)

(58) Field of Classification Search
CPC .......... F42B 35/00; F42C 17/04; F42C 21/00; G06F 13/102; G06F 13/16; F41H 13/00
USPC ....... 89/1.1, 1.55, 1.56, 1.811; 102/265, 270
See application file for complete search history.

(56) References Cited

U.S. PATENT DOCUMENTS 4,037,202 A * 7/1977 Terzian .................... G05D 1/12
                                                                      712/245
5,048,771 A * 9/1991 Siering ................... F41G 7/007
                                                                      244/3.15

(Continued)

FOREIGN PATENT DOCUMENTS

| DE | 102009022007 A1 | 11/2010 |
|---|---|---|
| EP | 0432902 A2 | 6/1991 |
| EP | 2390615 A1 | 11/2011 |

OTHER PUBLICATIONS

NO Search Report, dated Mar. 23, 2018, from corresponding NO 20171387 application.

(Continued)

*Primary Examiner* — John Cooper
(74) *Attorney, Agent, or Firm* — Young & Thompson

(57) ABSTRACT

Disclosed is a method for changing operation mode of a weapon that is connected to a maintenance device via an umbilical providing signals and power to the weapon. The method includes transmitting a mode change control signal to electronics in the weapon via a pin on an electrical interface connecting the umbilical to the weapon, and switching the weapon from an operational mode to a non-operational mode and vice versa after receiving the mode change control signal. Also disclosed is a weapon and system including a unit for performing the method.

10 Claims, 4 Drawing Sheets

(56) References Cited

U.S. PATENT DOCUMENTS

| | | | | |
|---|---|---|---|---|
| 5,129,063 A | * | 7/1992 | Sainola | G06F 13/124 |
| | | | | 710/1 |
| 5,490,093 A | * | 2/1996 | Koepke | F41G 7/001 |
| | | | | 244/3.15 |
| 5,992,290 A | * | 11/1999 | Quebedeaux | F41G 7/007 |
| | | | | 89/1.51 |
| 6,067,851 A | * | 5/2000 | Chaves | F42B 35/00 |
| | | | | 73/167 |
| 2015/0082975 A1 | | 3/2015 | Huber et al. | |
| 2015/0089099 A1 | | 3/2015 | Huber et al. | |
| 2015/0370752 A1 | | 12/2015 | Hammel | |
| 2017/0244813 A1 | | 8/2017 | Hammel | |

OTHER PUBLICATIONS

Examination Report No. 1 for Standard Patent Application for Australian Patent Application No. 2018211249 dated Jul. 30, 2019.

* cited by examiner

METHOD AND SYSTEM FOR RELIABLY CHANGING OPERATION MODE OF A WEAPON

INTRODUCTION

The invention relates to a method and system for secure operation of an advanced weapon, and more specifically for reliably signaling to a weapon that a transition into maintenance mode is to be performed thus enabling maintenance actions like writing new software or other information to persistent memory.

BACKGROUND

The examples used in the description refer to a missile as an example of an advanced weapon. This is not meant to limit the description to a missile and the techniques described are applicable to any advanced weapon that can be programmed or configured in any way as will be obvious to the skilled reader.

It is common to have two or more separate operational modes incorporated in a weapon. The main mode being the mode where the weapon is to be used as it is intended, i.e. in an operational mode as a weapon. It is common to have a second non-operative mode, i.e. a maintenance mode, allowing critical maintenance operations like testing of major functionality, simulating arming of the weapon, or writing/deleting software/firmware in persistent memory in the weapon. An advanced weapon like a cruise missile can have separate SW running in the two different modes.

There are many ways to communicate with a missile when it is in a non-operative mode. The most common being some electrical communication protocol like Ethernet over either a separate connector (non-umbilical), or using one or more of the electrical pins adapted to this in an umbilical connector, or simply using MIL-STD-1553 standard protocol that is defined in the standard MIL-STD-1760 defining a standardized electrical interface between a military aircraft and its stores, e.g. a missile. MIL-STD-1760 defines the electrical characteristics of the signals at the interface, as well as the connector and pin assignments of all the signals used in the interface.

In US2015082975 it is described how operations, which are not possible only using MIL-STD-1760, can be implemented using an interface bridge as an additional HW between the aircraft and the weapon. In this solution both typical maintenance operations and typical operative operations that do not conform to the MIL-STD-1760-standard can be performed. In the present invention, the non-conformal operations are limited to maintenance mode for avoiding the use of additional HW on a carrier aircraft.

The transition from operational mode to a non-operational mode is critical. It is important that this transition is made in the safest and most reliable way possible for minimizing the risk of unintentionally entering a non-operational mode.

Mode changing functionality in missiles can be implemented in several ways. Elements that can be used are for instance: authorization of a user (for instance according to the MIL-STD-1553 protocol), strict procedures prior to sending critical software (SW) commands, "Remove before flight" hardware (HW), e.g. HW switches closed by removing a splint, that inhibit the before mentioned transition of operation mode. A combination of two or more of these is also feasible.

It is common to use some sort of physical inhibit function in combination with a SW command. Using a HW element has the advantage of being easier to observe and is less prone to bugs as is the case for a SW solution. In other words, a HW solution does not need the extensive testing that a SW solution would need when it comes to proving reliability.

The disadvantage of HW, like for instance a physical switch, is that it in some way needs to be accessible from the outside of the weapon. This poses potential problems and maintenance issues.

An umbilical connector used for communicating with a missile is defined in the military standard MIL-STD-1760. All pins in this connector are occupied by some function. To be allowed to use a store on an aircraft, the store must strictly adhere to said standard. A store is a device intended for internal or external carriage and which is mounted on aircraft suspension and release equipment.

A missile is military equipment with a set security classification. The set classification can in some cases be different from the classification of the equipment it is connected to. If the equipment in question has a lower classification than the equipment it is connected to it is important to ensure that no classified information from equipment with higher classification is passed to equipment with a lower classification in a permanent way.

The present invention provides a secure way of assuring that no classified information can pass from equipment with a high classification, like an aircraft, to equipment with a lower classification, like a missile, while conforming to MIL-STD-1760 using an existing umbilical connecting said missile to said aircraft.

SHORT DESCRIPTION

The present invention is defined by a method for changing operation mode of a weapon connected to a maintenance device via an umbilical providing signals and power to the weapon. The method is characterized in transmitting a mode change control signal to electronics in the weapon via a pin on an electrical interface connecting the umbilical to the weapon, and switching the weapon to a non-operational mode after receiving said mode change control signal.

The invention is also defined by a weapon with means for changing operation mode of the weapon that is connected to a maintenance device via an umbilical providing signals and power to the weapon. The weapon comprises an external interface with pins for connecting the weapon to the maintenance device via the umbilical, and a receiver and mode changing electronics comprising a switch connected to one or more of said pins for receiving a mode change signal via a pin.

Further features of the invention are defined in the claims.

DETAILED DESCRIPTION

According to the invention, a method is provided for changing operation mode of a weapon connected to a maintenance device. The connection is enabled by an umbilical providing signals and power to the weapon.

The method is characterized in transmitting a mode change control signal to electronics in the weapon via a pin on an electrical interface connecting the umbilical to the weapon, and switching the weapon to a non-operational mode after receiving said mode change control signal.

The invention is also defined by a weapon with means for changing operation mode of the weapon that is connected to a maintenance device via an umbilical providing signals and power to the weapon. The weapon comprises an external interface with pins for connecting the weapon to the maintenance device via the umbilical, and a receiver and mode changing electronics comprising a switch connected to one or more of said pins for receiving a mode change signal via a pin.

The invention will now be described in detail with reference to the drawings, where:

Figure 1:
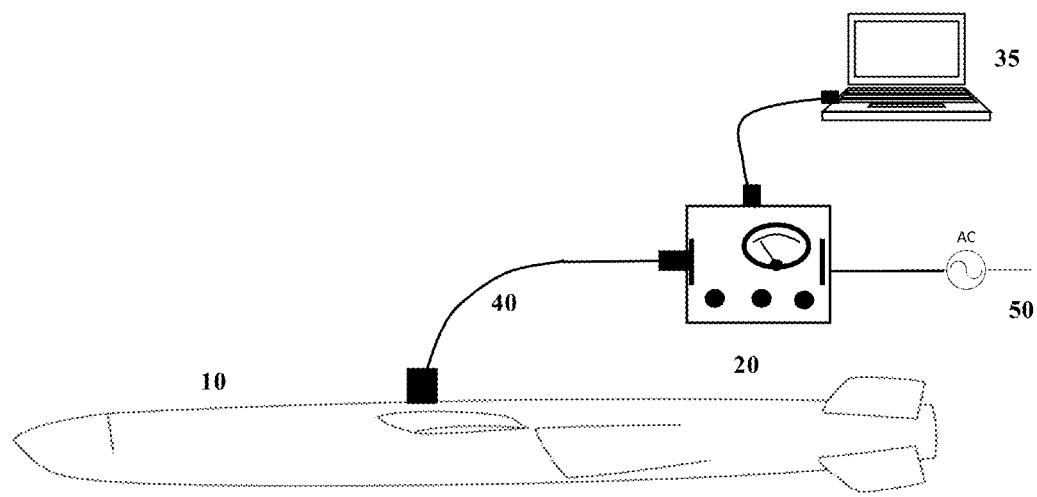
FIGS. 1 and 2 show a missile with maintenance equipment connected through an umbilical connector.

FIG. 1 shows an example of a weapon 10 connected to maintenance equipment. In this case a missile is connected to a maintenance device 20 via an umbilical 40. The maintenance device 20 is connected to a computer 35 and power supply 50.

Figure 2:
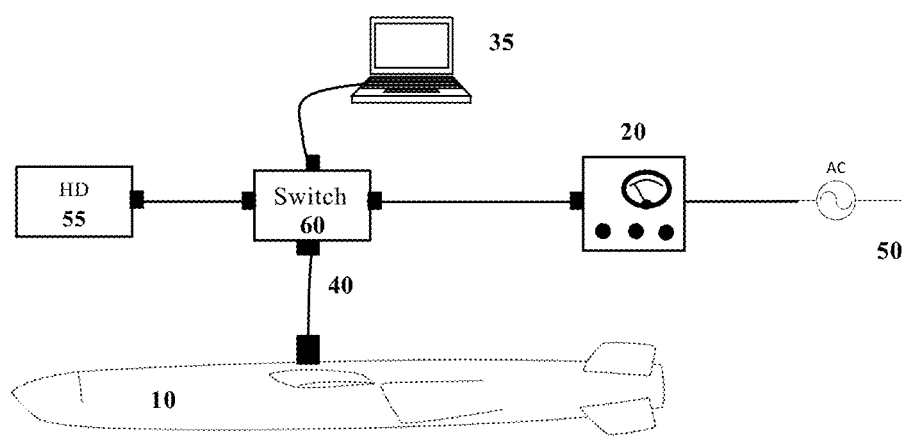

FIG. 2 shows another example of a possible maintenance configuration. In this configuration, a missile is connected to a switch 60 via an umbilical 40. The switch 60 is further connected to the maintenance device 20, the computer 35 and an optional information storage device like for instance a hard disc 55. The maintenance device 20 is connected to a power supply 50. A skilled person will understand that many variations of configurations are possible. The two mentioned configurations are only two examples.

Figure 3:
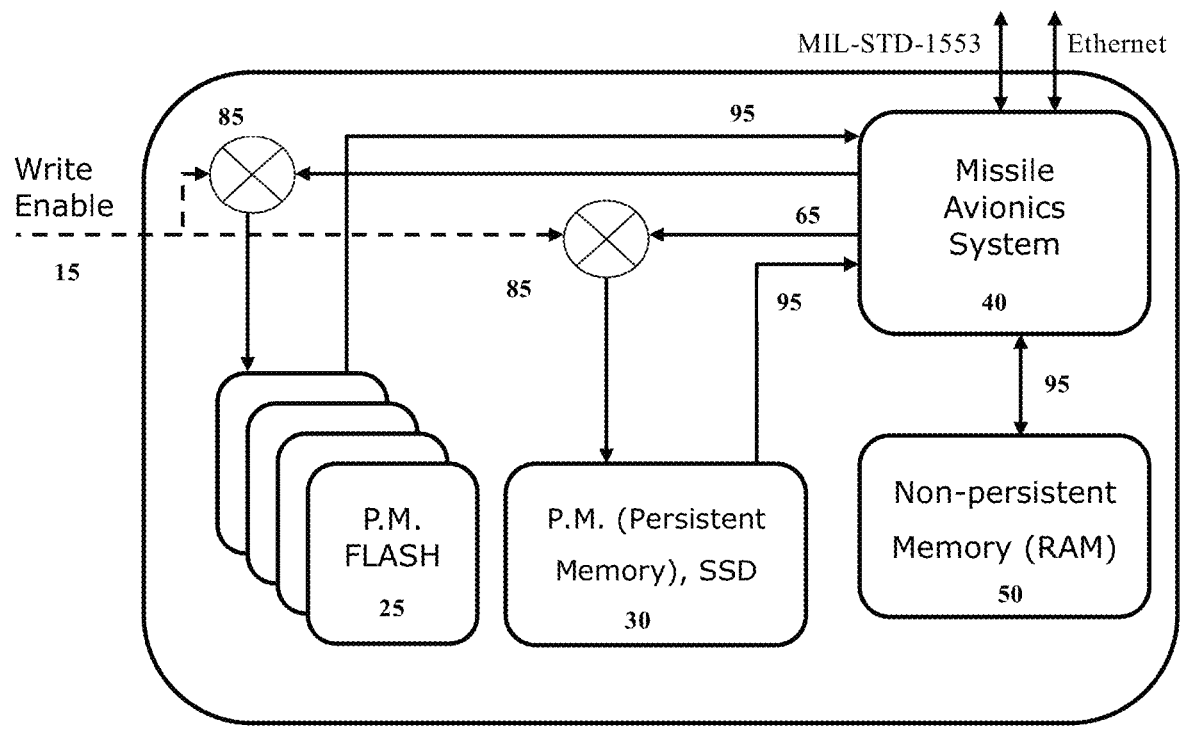
FIGS. 3, 4 and 5 show examples of architecture of persistent and non-persistent memory in a missile.

FIG. 3 shows a functional drawing of an example of an embodiment of the HW memory architecture of persistent memory 25, 30 and non-persistent memory 50 comprised in the electronics of a missile. The persistent memory (PM) can be a solid state drive 30 (SSD) holding missile SW and data, or it can be PM flash 25, or both. When a write mode is enabled, i.e. when a physical signal is present on Write Enable (WE) input 15 of the electronics of the missile, mission data from the Missile Avionics System (MAS) 40 can be written 65 to the persistent memory 25, 30. The logical elements 85 that control the writing can be realised as "AND-gates". When there is no WE signal present, i.e. when there is no electrical "high" present on the "Write Enable" side of the AND—gates, no information can pass on the write-lines 65 from the MAS towards the PM. Information can however pass in the other direction from PM towards the MAS on the "read-lines" 95.

Figure 4:
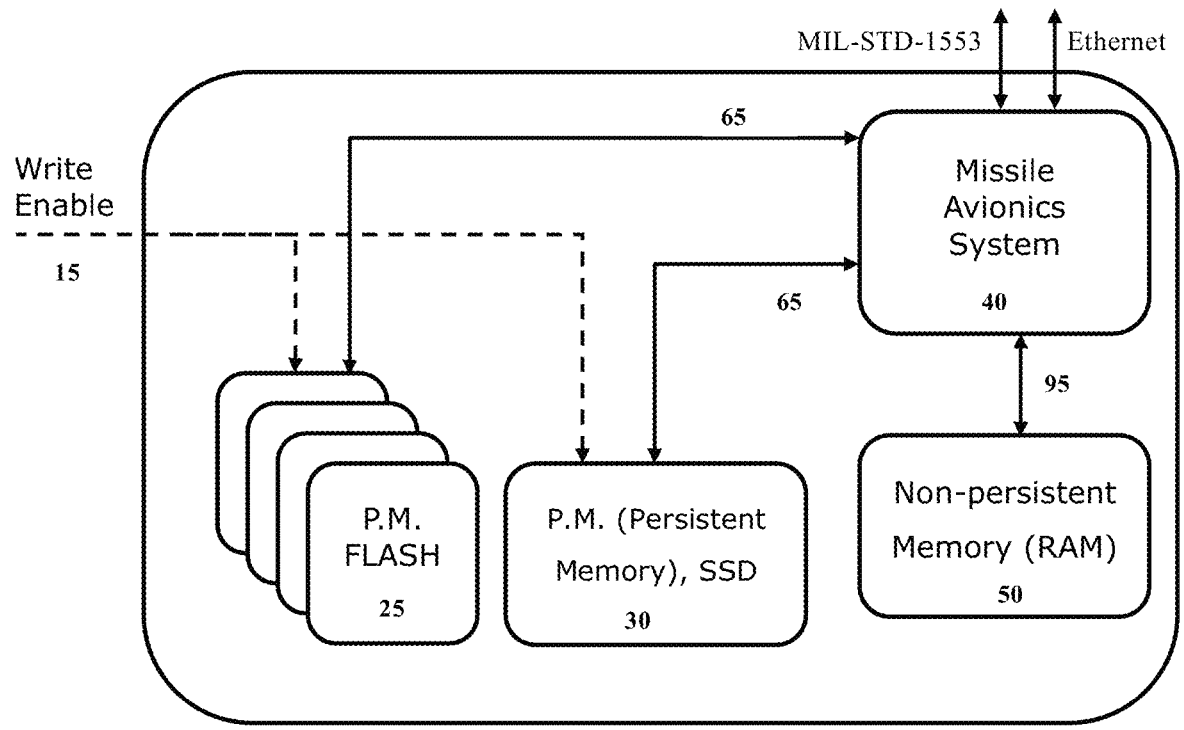

FIG. 4 shows a physical realisation of the functional drawing in FIG. 3. This figure looks different because all modern persistent memory chips (Flash) or all other persistent memory architectures like a classical Hard Disc (HD) with moving parts will have "Write Enable" functionality implemented internally in the chip or HD. These chips can only be written to when the "WE" pin is set.

Figure 5:
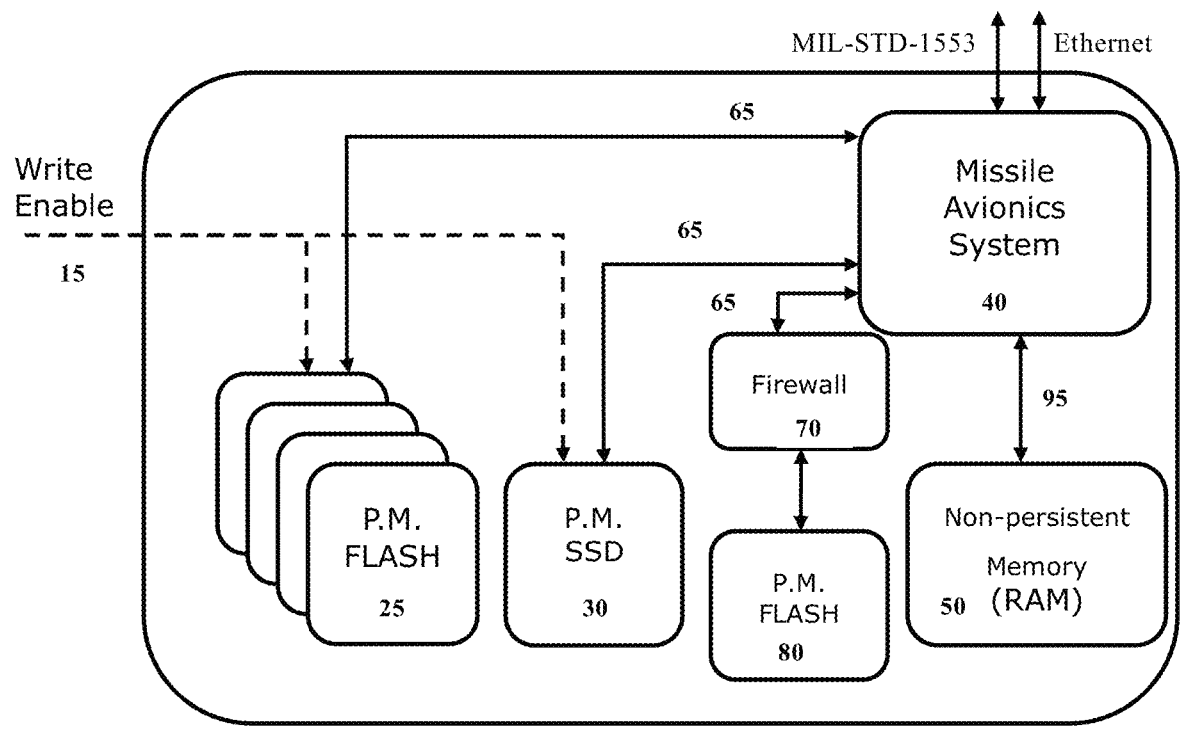

FIG. 5 shows another embodiment where one or more of the separate persistent memory units 80 are protected from being written to by other means than the common write enable signal. One way of protecting these units from unwanted writing of information is to connect them behind an entity that strictly inspects and controls all communication to and from the persistent memory unit. Such a unit is commonly referred to as a firewall 70. In a preferred embodiment, this firewall 70 does not contain a processor or software.

According to one embodiment of the method, the mode change control signal is a DC voltage supplied across an input of the pin of the electrical interface. In one embodiment, the DC voltage set a write-enable pin on persistent memory in the weapon 10. In one embodiment of the invention, a limited set of information is written by electronics in the weapon 10 for separating persistent memory through a firewall even when the DC voltage is not present.

In one embodiment, the mode change control signal control which software to run the computer 35 connected to the maintenance device 20. In one embodiment, the weapon 10 request confirmation from the said maintenance device 20 prior to enabling running of a chosen software on the computer 35.

In one embodiment of the invention, the DC voltage is used for controlling an RF switch comprised in the weapon electronics for switching between a non-operational mode and an operational mode via the external electrical interface present on the weapon 10. The non-operational mode is in one embodiment used for controlling transmission and reception of Ethernet signals via one or more pins on the electrical interface that are allocated for other communication during operational mode.

Figure 6:
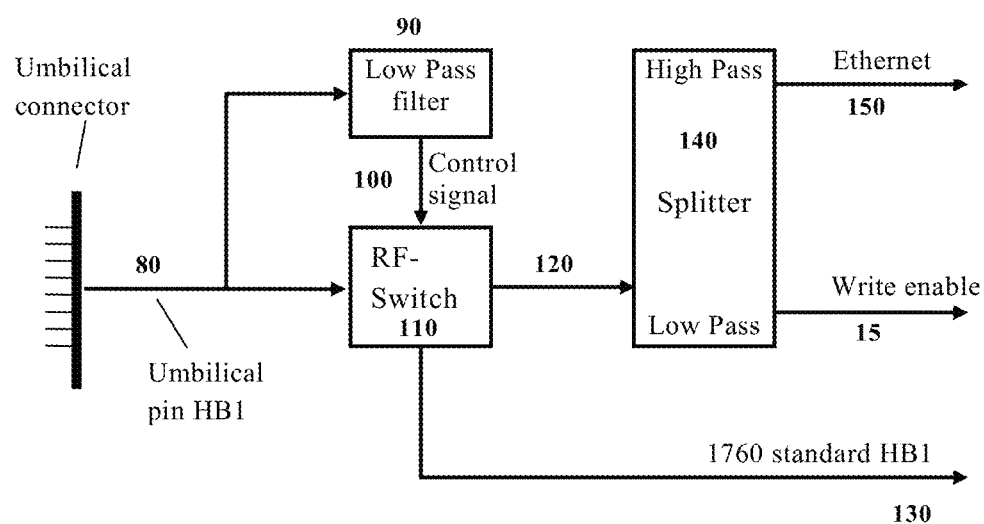
FIG. 6 illustrates one embodiment of the circuitry that is connected to an umbilical connecting a missile to an aircraft or maintenance equipment.

FIG. 6 illustrates one embodiment of the circuitry connected to an umbilical connector, where the umbilical connects a missile to an aircraft.

The MIL-STD-1760 pin HB1 is chosen in this example. The Radio Frequency (RF) switch 110 connects the incoming signal to use the MIL-STD-1760 HB1 if there is no DC component on the control signal pin. If there is a DC component on the HB1 pin, the RF switch connects the incoming signal to a network (Ethernet 150) and Write Enable is set. It will then be possible to download new SW, firmware or other data to persistent memory via the network.

The signals received on the umbilical are in general filtered and sent on to their respective counterparts in the avionics system. In our case where we have put a triple use on the HB1 pin, this is a coaxial pin in the connector, and this input 95 goes directly to two circuits; a low-pass filter 90 to extract the "mode change signal" described as a control signal 100 and a RF Switch 110 (i.e. a physical switch able to reliably switch a broadband signal), to switch the signal to one of two recipients, and thus switching between operation modes. The signal on HB1 may comprise a high frequency component and a "very low frequency" component, in practice a DC component. These can easily be split in a filter. The DC component is "on or off" in the meaning that it is either present or not. The resulting control signal 100 is used to control the RF switch 110 in such a way that when this DC component is present the switch 110 is set to switch the incoming HB1 signal 80 to a maintenance mode 120, and when the DC component is not present the signal is switched to operational mode 130, which use is specified in the MIL-STD-1760. In the maintenance mode, when the DC component is present, the signal 120 is switched to be input to a splitter 140. In the splitter 140, the signal is split in a low frequency component which is the write enable signal 15, and a high frequency part comprising control and SW commands etc. The high frequency part is in a preferred embodiment an Ethernet signal.

Figure 7:
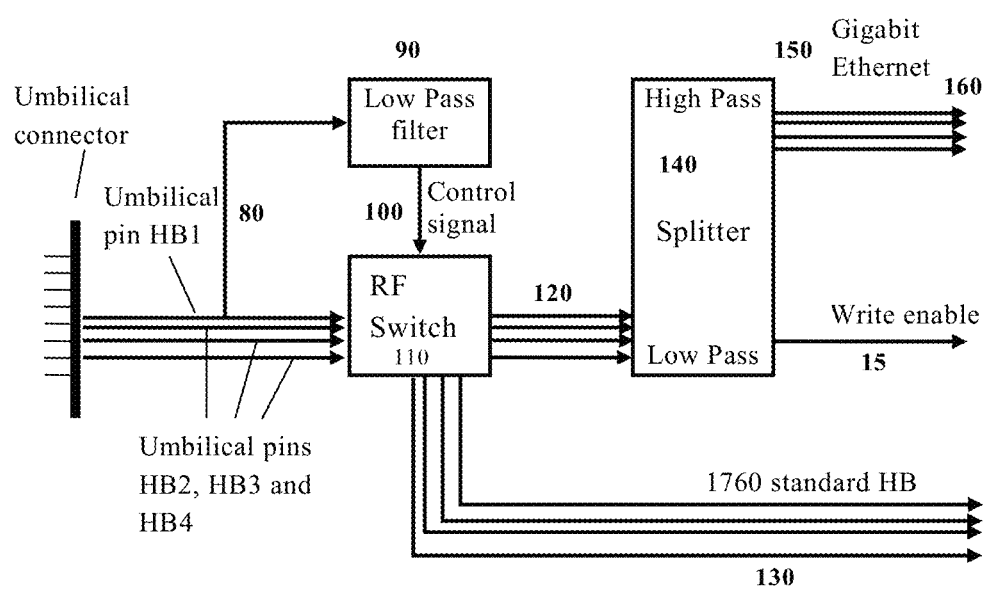
FIG. 7 shows one embodiment where all four available HB-pins in the MIL-STD-1760 are used for Gigabit Ethernet.

FIG. 7 illustrates an embodiment where all four available HB-pins comprised in the MIL-STD-1760 are used for Gigabit Ethernet communication. The figure is like FIG. 6 except for the addition of umbilical pins HB2, HB3 and HB4.

The invention is also described by a process for changing operation mode of a weapon 10 by write enabling persistent memory in the weapon 10 by using a maintenance device 20 that is connected to the weapon 10 via an umbilical 40 providing signals and power to the weapon 10, and where the maintenance device 20 is transmitting a control signal to electronics in the weapon 10 via a pin on an electrical interface connecting the umbilical 40 to the weapon 10, and write enabling the persistent memory after receiving said mode change control signal.

The control signal used for write-enabling the persistent memory in the process above is a DC voltage supplied across an input of the pin of said electrical interface.

The present invention provides improved functionality and solves the problems mentioned in the background section above by providing double functionality on a pin of an umbilical connector, connecting a missile to an airplane, and doing this without interfering with strict regulations according to the MIL-STD-1760.

By using RF switches and high/low band-pass filtering it is possible to send an additional electrical signal from maintenance equipment using the existing umbilical connector. This enables an entirely independent and reliable operation mode switch. A missile uses this additional electrical signal to set, and preferably power, the write-enable pin on all persistent memory on board the missile in addition to using the absence of this signal as an inhibit for entering maintenance mode. In this way, it can be assured that no additional information, except the information already present at last power up will be stored in the missile after the power is turned off.

The SW architecture inside a missile, or any advanced weapon, can in general be split into two blocks operating in different modes: an operational mode and a non-operational mode. The operational mode is used in actual missions and in some specific testing scenarios. The non-operational mode is used in all other scenarios. The non-operational mode is often called maintenance mode. The reason for this is that after production and testing of a missile is completed the non-operational mode is mainly used for maintenance purposes. When a missile is powered up one of the first things being checked is which mode it is in.

Current mode of a missile has impact on which SW and firmware (FW) to run and which functionality that is available for a user. It is important that the mode chosen is based on the right decision. A wrong decision will in both cases introduce serious risks. Choosing maintenance mode in a real mission will normally not allow the mission to be completed, and choosing operational mode in a maintenance scenario can lead to major risk to maintenance crew.

In a preferred embodiment when the missile is powered up the missile will make the decision as to which mode it is in by looking at either presence or absence of the Maintenance Mode Signal (MMS) and a SW-command transmitted via the umbilical connector. Only if both these "signals" are coherent the missile will move on into one of the two above mentioned modes.

1) MMS=present AND SW-CMD=Maintenance: Maintenance mode
2) MMS=not-present AND SW-CMD=Operational: Operational mode
3) MMS=present AND SW-CMD=Operational: Recovery mode
4) MMS=not-present AND SW-CMD=Maintenance: Stays in Power-up The two last cases are Error-states. In the third case 3) "Recovery mode" the missile will only allow new SW to be loaded. In the fourth case 4) the missile will not leave the power-up state and can only be rebooted.

The invention is further described by a system for changing operation mode of a weapon 10, comprising a maintenance device 20 connected to the weapon 10 via an umbilical 40 providing signals and power to the weapon 10, and where the maintenance device 20 is enabled for transmitting a control signal to electronics in the weapon 10 via a pin on an electrical interface connecting the umbilical 40 to the weapon 10, and where the persistent memory in the weapon 10 is write enabled after receiving said mode change control signal.

This allows the design of a missile system, where "missile system" is considered to be the missile with its maintenance equipment and relevant aspects/interfaces of an aircraft carrying the missile, in such a way that the "maintenance mode"/"write enable" signal (MMS) can never be present via the aircraft interface whereas it will always be present via the correct maintenance equipment.

When delivered from the factory an advanced missile will have SW and FW pre-installed and the missile will have a security classification which is dependent on both SW and HW. This may be a relatively low classification for easing handling of the missile. Equipment having a higher classification will have stricter restrictions for being handled, e.g. guarding and locking.

One technique for keeping a low classification for a missile is letting important information pertaining to a specific mission being retained as long as possible, prior to launch. One way of doing this can for instance be to load the mission critical information onto the missile only when the missile is already connected to its carrier aircraft and powered up. In other words, mission critical information is relayed from the aircraft just prior to launch of the missile.

In one example, a missile has a relatively low classification while an aircraft carrying it as well as specific mission data has a relatively higher classification. When the missile is connected to the aircraft and powered up, the aircraft will fly towards a launch area. On its way to the launch area it will prepare the missile for its mission by downloading the higher classified mission data onto the non-persistent memory of the missile. The missile will now have a classification according to the highest classification of the mission data.

If a mission is cancelled and the aircraft returns to its base, the missile is powered down and detached from the aircraft. The missile will be returned with its lower classification because we know that it was not physically possible to write to its persistent memory during the time the missile was powered as long as there was no "maintenance mode signal" available and hence the persistent memory write enable could not be set.

In a second example, a missile has a relatively low classification while an aircraft carrying it has a relatively higher classification. When the missile is connected to the aircraft and powered up, the aircraft will fly towards a launch area. During flight, the missile cannot write to its common persistent memory like the SSD (Solid State Disc) because the missile write enable signal is not set. The missile will however record a set of events in a separate persistent memory which is not controlled by the missile write enable (MMS) commonly referred to as an error log through a firewall. The firewall, ref. FIG. 5, inspects and controls the content of everything that is written to this persistent memory in such a way that no classified information can pass. A typical way of assuring that only a limited set of information can pass the firewall is to use what is often referred to as a "whitelist". This works by comparing and only letting information pass that follows a syntax and structure that can be found in the firewall memory. The firewall can be configured with a "whitelist" that is made in such a way that one can be sure that no information with a higher classification than allowed can pass. This of course demands a complete understanding of how information is communicated inside the missile.

In the unlikely event that the mission is cancelled due to the malfunction of the missile, the aircraft returns to its base, the missile is powered down and detached from the aircraft. The missile will be returned with its lower classification because we know that it was not possible to write classified information to its persistent memory during the time the missile was powered. The missile error log can now be inspected and the reason for the malfunction can be found.

In the preceding description, various aspects of the invention have been described with reference to the illustrative embodiments. For purposes of explanation, specific numbers, systems and configurations were set forth in order to provide a thorough understanding of workings of the invention. However, this description is not intended to be construed in a limiting sense. Various modifications and variations of the illustrative embodiment, as well as other embodiments, which are apparent to persons skilled in the art to which the disclosed subject matter pertains, are deemed to lie within the scope of the present invention. The focus of the invention has been on a method and system for reliably changing operation mode of a missile. A skilled person will understand that the invention is also applicable to other weapon systems requiring secure operation and switching between operation modes.

The invention claimed is:

1. A method for changing an operation mode of a weapon connected to a maintenance device via an umbilical providing signals and power to the weapon, the method comprising:
   transmitting a mode change control signal from the maintenance device to electronics in the weapon via a pin on an external electrical interface connecting the umbilical to the weapon; and
   switching the weapon to a non-operational mode after receiving said mode change control signal that is a direct current (DC) voltage supplied across an input of the pin of the external electrical interface, the DC voltage setting a write-enable pin on persistent memory in the weapon.

2. The method according to claim 1, wherein the mode change control signal controls software that is to be run on a computer connected to the maintenance device.

3. The method according to claim 2, wherein the weapon requests confirmation from the maintenance device prior to running the software on the computer.

4. The method according to claim 1, allowing electronics of the weapon to write a limited set of information to separate the persistent memory through a firewall.

5. The method according to claim 1, further comprising using said DC voltage to control a radio frequency (RF) switch comprised in the weapon electronics and configured to switch between a non-operational maintenance mode and an operational mode via the external electrical interface present on the weapon.

6. The method according to claim 5, wherein the non-operational mode is used for controlling transmission and reception of Ethernet signals via one or more of the pin and one or more other pins on the external electrical interface that are allocated for other communication during operational mode.

7. A weapon comprising:
   a system configured to change an operation mode of the weapon that is configured to be connected to a maintenance device via an umbilical providing signals and power to the weapon;
   an external electrical interface with pins configured to connect the weapon to the maintenance device via the umbilical; and
   a receiver and mode changing electronics comprising a switch connected to one or more of said pins configured to receive a direct voltage (DC) mode change signal via one of the pins on the external electrical interface.

8. The weapon according to claim 7, wherein the mode changing electronics further comprise
   a low pass filter passing configured to pass a mode change signal to the switch, and
   a splitter comprising high-pass and low-pass filters, the high-pass filter passing an Ethernet signal, the low-pass filter passing a write enable signal.

9. The weapon according to claim 8, wherein the switch is a radio frequency (RF) switch.

10. The weapon according to claim 7, wherein the switch is a radio frequency (RF) switch.

* * * * *